(12) United States Patent
Cohen et al.

(10) Patent No.: US 8,214,892 B2
(45) Date of Patent: Jul. 3, 2012

(54) PASSWORD AUTHENTICATION SYSTEM AND METHODS

(75) Inventors: Ira Cohen, Modiin (IL); Eli Mordechai, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 12/503,238

(22) Filed: Jul. 15, 2009

(65) Prior Publication Data

US 2011/0016520 A1    Jan. 20, 2011

(51) Int. Cl.
*G06F 7/04* (2006.01)
*H04L 9/00* (2006.01)

(52) U.S. Cl. ............... 726/19; 726/16; 726/17; 726/18; 726/20; 726/21; 713/183; 713/184; 713/185

(58) Field of Classification Search ............... 726/1–36; 713/150–194
See application file for complete search history.

(56) References Cited

U.S. PATENT DOCUMENTS

| | | | |
|---|---|---|---|
| 6,195,698 B1 | 2/2001 | Lillibridge et al. | |
| 7,065,786 B2 | 6/2006 | Taguchi | |
| 7,430,720 B2 | 9/2008 | Hua et al. | |
| 7,512,978 B1 | 3/2009 | Screen et al. | |
| 2004/0010721 A1* | 1/2004 | Kirovski et al. | 713/202 |
| 2005/0144484 A1 | 6/2005 | Wakayama | |
| 2007/0061589 A1 | 3/2007 | Ulmer et al. | |
| 2007/0209014 A1 | 9/2007 | Youmtoub | |
| 2008/0216163 A1 | 9/2008 | Pratte et al. | |
| 2009/0037986 A1 | 2/2009 | Baker | |
| 2009/0094687 A1 | 4/2009 | Jastrebski et al. | |
| 2009/0106827 A1 | 4/2009 | Cerruti et al. | |
| 2009/0113294 A1 | 4/2009 | Sanghavi et al. | |
| 2009/0232351 A1* | 9/2009 | Kagitani et al. | 382/100 |
| 2009/0307765 A1* | 12/2009 | Mardikar et al. | 726/7 |
| 2011/0029902 A1* | 2/2011 | Bailey | 715/764 |

OTHER PUBLICATIONS

Monrose et al, Password hardening based on keystroke dynamics, 2001, Springer-Verlag, 75.*

* cited by examiner

*Primary Examiner* — Longbit Chai
(74) *Attorney, Agent, or Firm* — Nathan R. Rieth

(57) ABSTRACT

A system and methods authenticate sensitive information such as passwords. Password characters are transformed into distorted characters and distorted character groups are generated such that each distorted password character is part of a group. An image is created containing the groups and the password or other sensitive information is authenticated when groups are identified within the image that contain the password characters in an expected sequence.

15 Claims, 8 Drawing Sheets

PASSWORD AUTHENTICATION SYSTEM AND METHODS

BACKGROUND

Authentication is an essential component in preventing abuse and unauthorized access to network based services. Without secure methods of authentication, many services offered online such as e-mail, banking, credit card management, bill-paying, shopping, etc., could not exist. One common method of authentication is through password verification. However, conventional password protection is often inadequate to protect against the increasing number and sophistication of methods employed by criminals who seek to gain unauthorized access to online services by stealing passwords and other sensitive information from users.

Typical methods of obtaining passwords and other sensitive user information include the use of malware (malicious software), phishing, pharming, man-in-the-middle attacks, and "shoulder surfing". Malware includes any type of malicious software intended by a hacker to gain access to or damage a computer without the knowledge or consent of the owner. Thus, malware may include viruses, worms, trojan horses, rootkits, spyware, adware, and other unwanted software. Malware can be used to steal sensitive information such as usernames, passwords and credit card numbers from unsuspecting users by installing key loggers on computers that intercept user keystrokes and transmit them back to a criminal hacker. This enables the hacker to commit various fraudulent transactions by gaining unauthorized access to a user's network accounts and services such as online bank accounts, credit card accounts, and the like.

Phishing is another method criminal hackers use to try and steal sensitive user information such as usernames, passwords and credit card numbers. Phishing is a method of directing an unsuspecting user (e.g., through an email or instant message) to a fake website that appears to be legitimate so that the user will enter sensitive information which the hacker can then use to gain unauthorized access to the user's online accounts and services to commit various fraudulent transactions. Pharming is similar to phishing in that a fake or bogus website is used by the hacker to steal sensitive user information. In pharming, however, all of the traffic coming to a website is directed to the fake website.

A man-in-the-middle (MITM) attack is yet another of numerous methods hackers use to commit fraud. In a MITM attack, malicious software intercepts communications between parties of a transaction, such as a user accessing an online bank account. The MITM attacker can alter the content of the communications and/or send them to unintended recipients, and return falsified messages to both parties without either party knowing the communications were compromised. By recording transactions between parties, the attacker gains access to a user's sensitive information which can be used to commit fraud, such as stealing money from the user's bank account.

"Shoulder surfing" is a method of accessing sensitive information through direct observation of a user's activities at a computer. A hacker can literally look over the user's shoulder to try and gain information, or he can use less noticeable techniques of observation such as viewing a user from a distance with binoculars or through small, hidden cameras.

BRIEF DESCRIPTION OF THE DRAWINGS

The present embodiments will now be described, by way of example, with reference to the accompanying drawings, in which.

DETAILED DESCRIPTION

Overview of Problem and Solution

Figure 1:
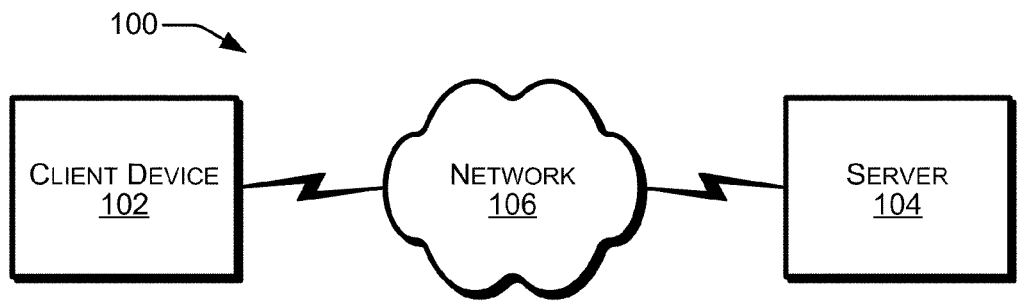
FIG. 1 shows an exemplary computing environment suitable for implementing authentication systems and methods according to an embodiment.

As noted above, authentication is a critical component in providing secure online transactions. There are various methods used by criminal hackers to gain access to a user's sensitive information (e.g., usernames, passwords, credit card numbers), such as malware, phishing, pharming, man-in-the-middle attacks and shoulder surfing. Through these and other methods, criminals can access a user's sensitive information and use it to commit fraud.

Various methods for combating this type of online fraud have been developed. For example, a CAPTCHA (Completely Automated Public Turing test to tell Computers and Humans Apart) is an image that presents a challenge to a user, such as identifying a string of characters. The characters in a CAPTCHA are designed in a way that makes them recognizable to humans but difficult to recognize for machines. For example, characters in a CAPTCHA often have distorted shapes and are embedded within an image having background clutter that tends to blur the characters together and/or obfuscate their beginning and endpoints. Thus, the characters in a CAPTCHA are resistant to optical character recognition. An online server, therefore can protect online transactions with a client computer by requiring the user at the client computer to correctly recognize a string of characters from a CAPTCHA and enter the characters into a text box. The proper completion of the CAPTCHA at the client helps the server verify that a human, and not a machine, is performing the transaction.

Although CAPTCHA's can help prevent hackers with automated malware from compromising and/or abusing online systems, they are not a foolproof solution to such problems. There are ways to circumvent CAPTCHA's, such as using cheap human labor and improved optical character recognition (OCR) software to decipher the CAPTCHA's. Automated malware that encounters a CAPTCHA can relay the CAPTCHA to a human operator who can solve it and return the solution. Likewise, increasingly sophisticated OCR software may be available to help solve a CAPTCHA.

In addition to CAPTCHA's being decipherable by such measures, they also do not solve the problem of hackers accessing sensitive information through means such as shoulder surfing or the interception of communications between parties of a transaction. For example, although a human at a client computer may correctly solve a CAPTCHA, the characters of the CAPTCHA are still entered into the client computer and transferred (along with other sensitive information such as a username and password) back to the server. These information transfers can be intercepted and exploited by a hacker.

The present disclosure presents example embodiments of a system and methods that provide secure online authentication. A secure online authentication procedure generally includes a server creating an image comprised of groups of characters which are distorted, and transmitting the image to a client device. A user at the client device clicks on the distorted character groups in the image that include her password characters (or other sensitive information) and sends a location index back to the server indicating the sequence in which the groups were clicked. The server compares the sequence of the groups clicked with an expected sequence based on its knowledge of the user's password and the image it sent to the user. From the comparison, the server can authenticate or not whether the sequence from the user has properly identified the password.

Thus, the described embodiments are directed to reducing the risk of theft of sensitive information and related fraud in attack scenarios such as those discussed above (e.g., hacker attacks using malware, phishing, pharming, man-in-the-middle attacks and shoulder surfing) without a need for additional system hardware or significant changes to methods currently performed by online institutions and users to authenticate various transactions. Sensitive information such as passwords can be authenticated securely through such embodiments by a combination of techniques. For example, creating an image comprised of groups of characters that include password characters mixed into the groups enables a user to demonstrate knowledge of her password to a secure server by clicking instead of having to type the password. An observer (e.g., a shoulder surfer, MITM attacker, etc.) observing or intercepting the image and click information cannot know the user's password, as there are $K^n$ possible password combinations (with K being the number of characters in each character group and n being the password length). In addition, the characters in the image are distorted in a way that makes them resistant to automated character recognition methods but readily understood by humans. The OCR resistant characters further impose an expensive manual inspection of the user's actions on a hacker who would attempt to determine the $K^n$ possible password combinations, and would require a manual entry of the password by the hacker. This makes an automated login to the user's account by a hacker virtually impossible.

In one described embodiment, a method of authentication includes receiving a login request and accessing a password in response to the request. The characters of the password are transformed into distorted password characters that are OCR (optical character recognition) resistant. Distorted character groups are generated such that each distorted password character is part of a group. An image is created that contains the distorted character groups. The password is authenticated when a location index from a client identifies distorted character groups within the image that contain the password characters in an expected sequence.

In another embodiment, a method of authentication includes transforming characters of sensitive information into distorted characters that are OCR resistant. Each distorted character of sensitive information is combined with random characters that are similarly distorted such that each distorted character of the sensitive information is present within a distorted character group. An image is generated from the distorted character groups. The sensitive information is authenticated when a sequence of clicked positions from the image identifies characters of the sensitive information in a proper sequence.

In another embodiment, an authentication system includes a server configured for authenticating sensitive information. A login request module on the server is configured for receiving login requests and for retrieving the sensitive information in response to the login requests. An image generation module on the server is configured for generating an image comprising groups of distorted characters wherein characters of the sensitive information are interspersed throughout the groups. A comparison module on the server is configured for comparing an expected sequence of groups with a user-selected sequence of groups and for granting user access to the server when the user-selected sequence matches the expected sequence.

Illustrative Embodiments

FIG. 1 shows an exemplary computing environment 100 suitable for implementing authentication systems and methods as disclosed herein. Computing environment 100 includes client computing device 102 coupled to a server 104 through a network 106. Network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as one or more local area networks (LANs) and/or wide area networks (WANs) and combinations thereof.

Figure 2:
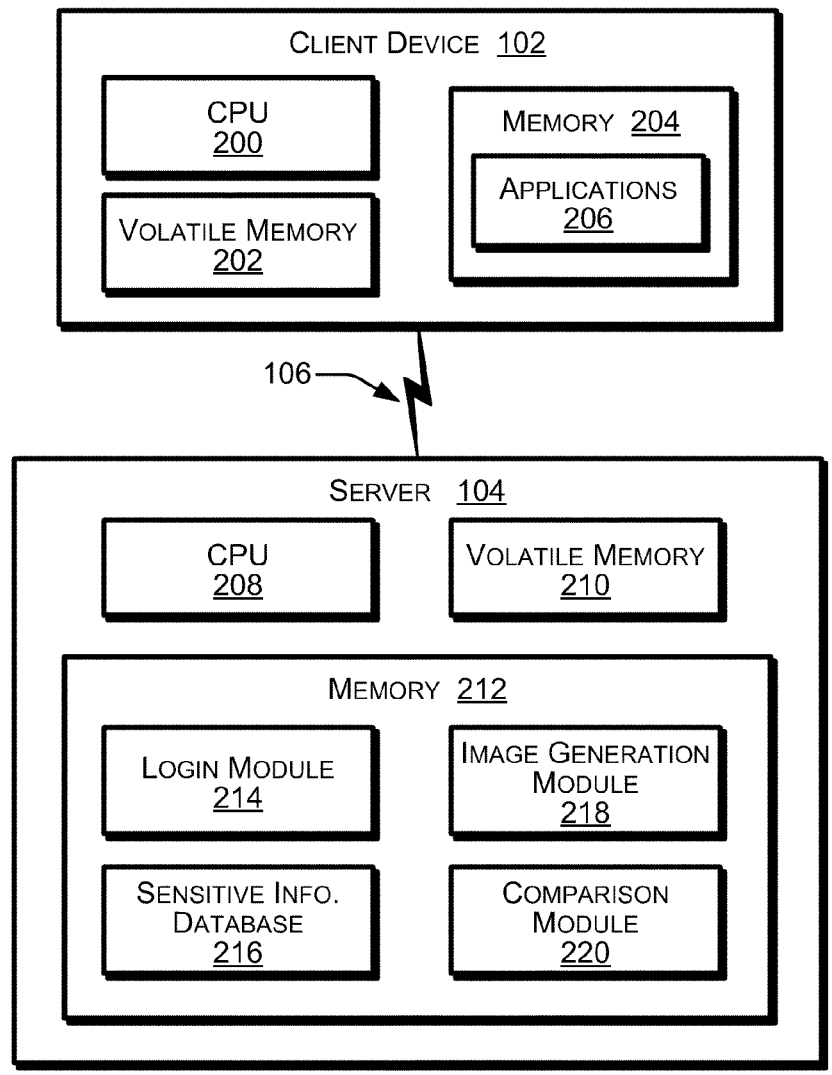
FIG. 2 shows the exemplary computing environment of FIG. 1 in greater detail according to an embodiment.

Client computing device 102 is illustrated in greater detail in FIG. 2. Client device 102 may be implemented as any of a variety of conventional computing devices configurable to communicate with a server 104 via a network 106, including, for example, a desktop PC, a notebook or portable computer, a workstation, a handheld PC, a cellular telephone or other wireless communications device, a personal digital assistant (PDA), a set-top box, combinations thereof, and so on. Client device 102 typically includes various input/output devices (not shown) such as a keyboard, a mouse, and a monitor. Client device 102 also generally includes a processor (CPU) 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for client device 102. Client device 102 may implement various application programs 206 stored in memory 204 or volatile memory 202 and executable on processor 200 to provide a user with the ability to perform transactions with server 104 via network 106 through inputting, manipulating and/or otherwise preparing data in electronic form (e.g., through text entry, mouse clicks, etc.). In one implementation, for example, client device 102 enables a user to view an image provided by server 104 and make selections of distorted character groups from the image in order to communicate sensitive information (e.g., a username, password, credit card number, etc.) to the server 104 for authentication.

Server 104 is illustrated in greater detail in FIG. 2. Server 104 generally comprises an arrangement of computer hardware and software configured to provide services to clients such as client device 102 after performing an authentication procedure. Services provided by a server 104 vary widely and may include, for example, email services, news services, entertainment media services, credit card services, banking services, investment services, and the like. Server 104 may be implemented as any of a variety of conventional computing devices, including, for example, a desktop PC, a notebook or portable computer, a workstation, a mainframe computer, an Internet appliance, combinations thereof, and so on. Server 104 may include various input/output devices (not shown) such as a keyboard, a mouse, and a monitor. Server 104 also generally includes a processor (CPU) 208, a volatile memory 210 (i.e., RAM), and a nonvolatile memory 212 (e.g., ROM, hard disk, floppy disk, CD-ROM, etc.). Nonvolatile memory 212 generally provides storage of computer/processor-readable instructions, data structures, program modules and other data for server 104. Server 104 may implement various application programs (not shown) stored in memory 212 or volatile memory 210 and executable on processor 208 to perform transactions with a client device 102.

In one implementation, as shown in FIG. 2, memory 212 of server 104 includes various program modules 214, 218, 220, and a sensitive information database 216 configured to provide a secure online authentication procedure. The secure online authentication procedure generally includes creating an image at the server 104 comprised of groups of characters which are distorted, and transmitting the image to the user at the client device 102. The user clicks on the distorted character groups that include her password characters (or other sensitive information) and sends back a location index indicating the sequence in which the groups were clicked. The server 104 compares the sequence of the groups clicked with an expected sequence based on its knowledge of the user's password and the image it sent to the user. From the comparison, the server 104 can authenticate or not, whether the sequence from the user has properly identified the password or other sensitive information.

After successful logins or authentications, for subsequent logins/authentications the server 104 can make various changes that will help prevent a hacker from automatically or manually replaying the click sequence made by the true user. For example, in a subsequent login or authentication attempt, the server 104 can generate a new image by changing the physical location of the same distorted character groups within the image, creating new distorted character groups to make up the image, change the distortion of the characters within distorted character groups, and/or any combination of these. After unsuccessful logins or authentications, the server 104 may keep the image the same without altering the distorted image groups, as this does not reveal any new information if the login attempt is made by a criminal hacker, and it eases usage for authentic users who have made inadvertent errors when clicking on the image.

Referring again to FIG. 2, sensitive information database 216 may contain various sorts of sensitive information related to users accessing services on server 104 such as, for example, usernames, passwords, social security numbers, credit card numbers, and the like. Sensitive information stored in database 216 is typically entered into the server 104 by a user during an initial setup of an account on the server 104. After an initial account setup on server 104, sensitive information database 216 is accessed as needed to retrieve sensitive information to facilitate a secure online authentication procedure.

Figure 3:
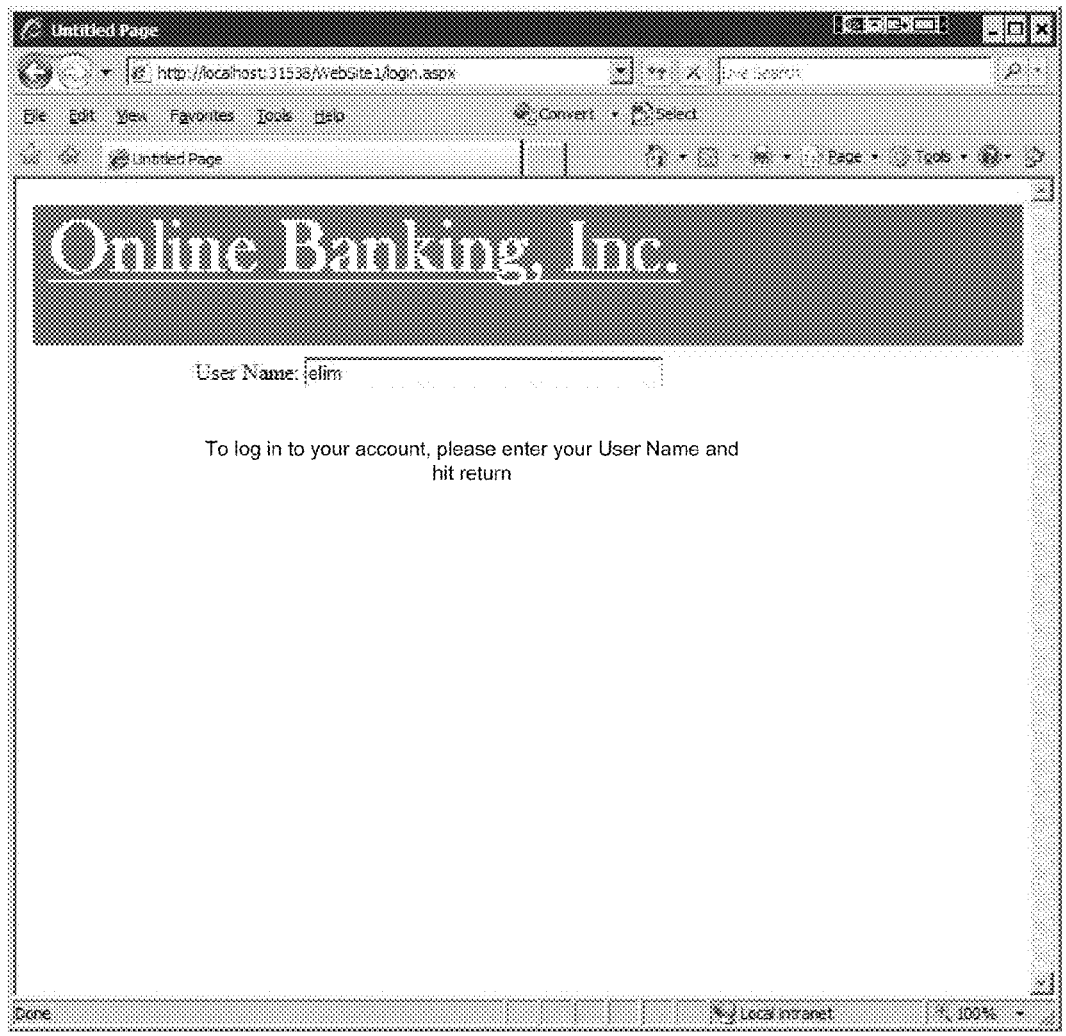
FIG. 3 shows an example of a basic login web page from a server offering an online service according to an embodiment.

Login module 214 is configured to facilitate login requests received from client device 102. Users typically make login requests from a client device 102 over network 106 by entering an identification (e.g., a username) and hitting return or by clicking on a login radio button or other selectable login option on a web page from server 104. FIG. 3 shows an example of how a basic login web page may initially appear from a server 104 offering an online banking service. In this example, a user wanting to log in to a previously established online bank account would enter a username and hit return. It is to be understood that there may be many different ways to initiate a login request of this type, and that FIG. 3 merely provides a basic example for the purpose of this description. Upon receiving the login request which identifies a user, login module 214 accesses sensitive information database 216 and retrieves a password or other sensitive information corresponding to the user. Login module 214 then transfers the password or other sensitive information to the image generation module 218.

Figure 4:
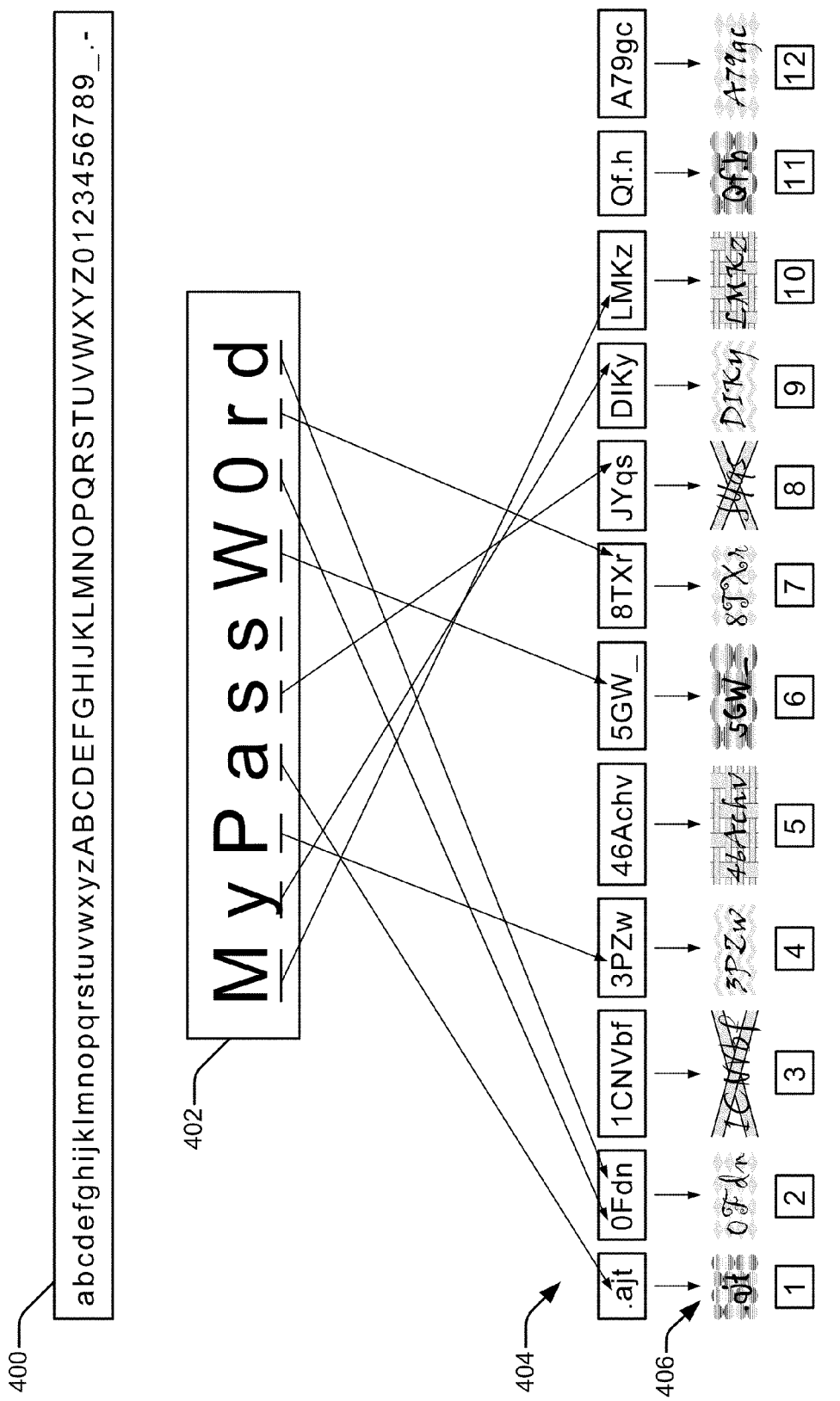
FIG. 4 shows possible steps for processing a password or sensitive information according to an embodiment.

Image generation module 218 receives the password or other sensitive information, and processes it to form distorted character groups and an image comprising the distorted character groups. Several possible steps for processing the password 402 (e.g., "MyPassW0rd" 402) are shown in FIG. 4, and although the steps appear in a particular order, they do not necessarily have to be performed in that particular order. An example character set 400 is shown, which is the character set from which character groups 404 and distorted character groups 406 are generated. A group index number 408 is assigned to each distorted character group 406 so that an authentic sequence of distorted character groups 406 that identifies the password 402 is known. This enables authentication of the password later when a user provides a location index indicating a sequence of distorted character groups the user has clicked on during a login attempt.

Image generation module 218 forms character groups 404 by selecting characters from a subset of available character set 400. The subset includes all characters within available character set 400 except characters which are part of the password 402 (i.e., "MyPassW0rd" 402) or other sensitive information. Characters from the password 402 are then inserted into the character groups 404 such that each password character appears in a character group 404. More than one password character can appear in a character group (e.g., group index number 2), and some character groups may not contain any password characters (e.g., group index numbers 3, 5, 11, 12). Therefore, there may be more or less character groups 404 than there are characters in the password 402. Each character group 404 is typically between three and seven characters in length, but the length can vary.

Figure 5:
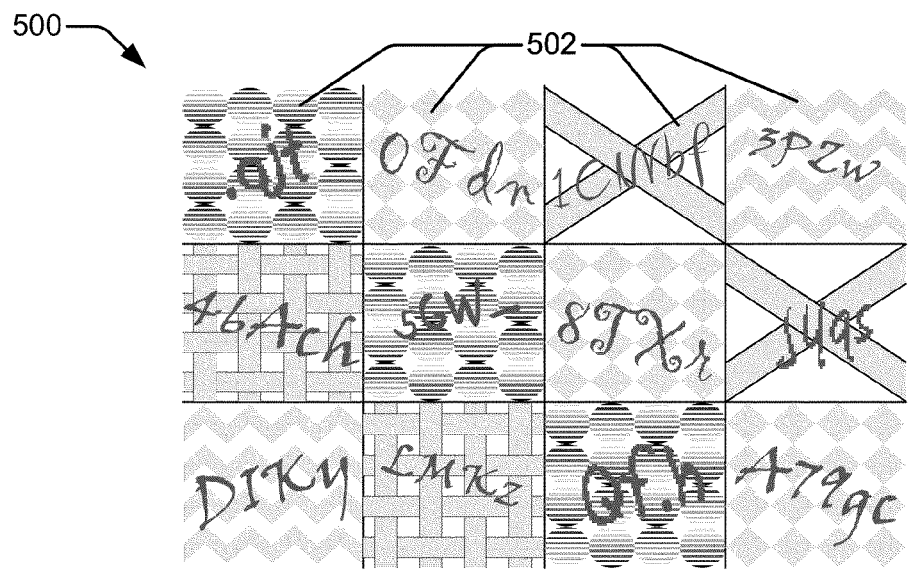
FIG. 5 shows an example of an image formed from distorted character groups according to an embodiment.

As shown in FIG. 45 image generation module 218 then distorts the characters in the character groups 404 (e.g., by distorting their shapes and/or positioning) and embeds the groups within one or more background distortion images having background clutter. This results in distorted character groups 406 that are OCR resistant. Image generation module 218 then generates an image which is made up of the distorted character groups 406. FIG. 5 illustrates an example of an image 500 formed from the distorted character groups 406 of FIG. 4. The image 500 includes the distorted character groups 406 laid out in a rectangular grid. However, the distorted character groups 406 could be laid out within image 500 in other patterns such as an irregular grid pattern, a straight line, or in any other suitable configuration that would permit a user to view the image and click on the distorted character groups 406.

Figure 6:
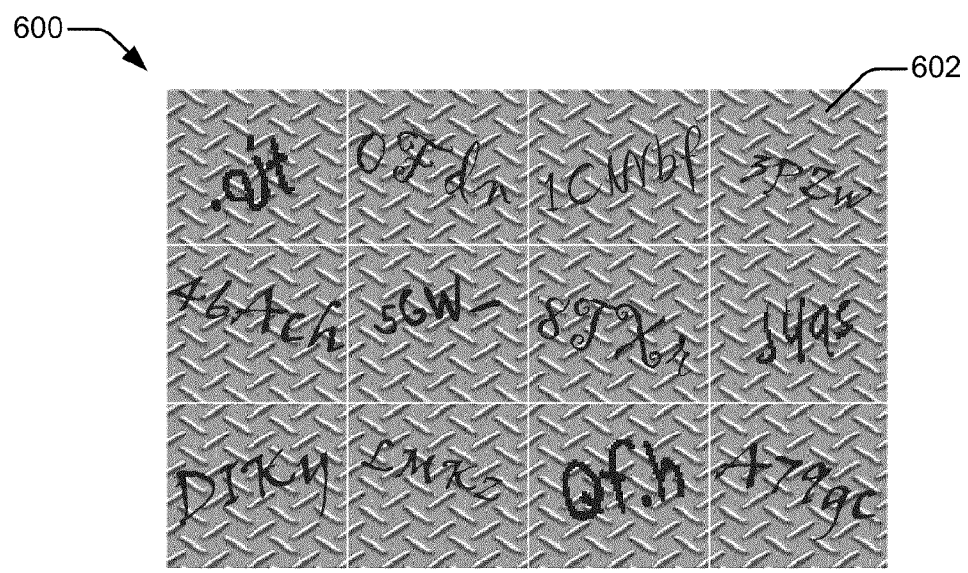
FIG. 6 shows an image where distorted character groups are embedded on a single background distortion image in a rectangular grid pattern according to an embodiment.
Figure 7:
FIG. 7 shows an image where distorted character groups are embedded on a single background image that is a personal image previously uploaded by the user according to an embodiment.

As mentioned above, each distorted character group can be embedded in background distortion images that are the same or different from one another. In FIG. 5, for example, the generated image 500 has background distortions 502 that vary between most of the distorted character groups, but then begin to repeat. In an alternative embodiment, image generation module 218 may also generate an image where the background comprises a single distortion image. For example, FIG. 6 illustrates an image 600 where distorted character groups are embedded on a single background distortion image 602 in a rectangular grid pattern. In another alternative embodiment, image generation module 218 may also generate an image where the background comprises a user's own personal image previously uploaded to the server 104. For example, the generated image 700 shown in FIG. 7 includes distorted character groups embedded in a rectangular grid pattern on a single background image that is a personal image 702 previously uploaded by the user. The use of a personal image 702 in the background enables the user to quickly verify that the server 104 sending the image is authentic, thus making it more difficult for a hacker to impersonate the server 104.

Figures 8, 9:
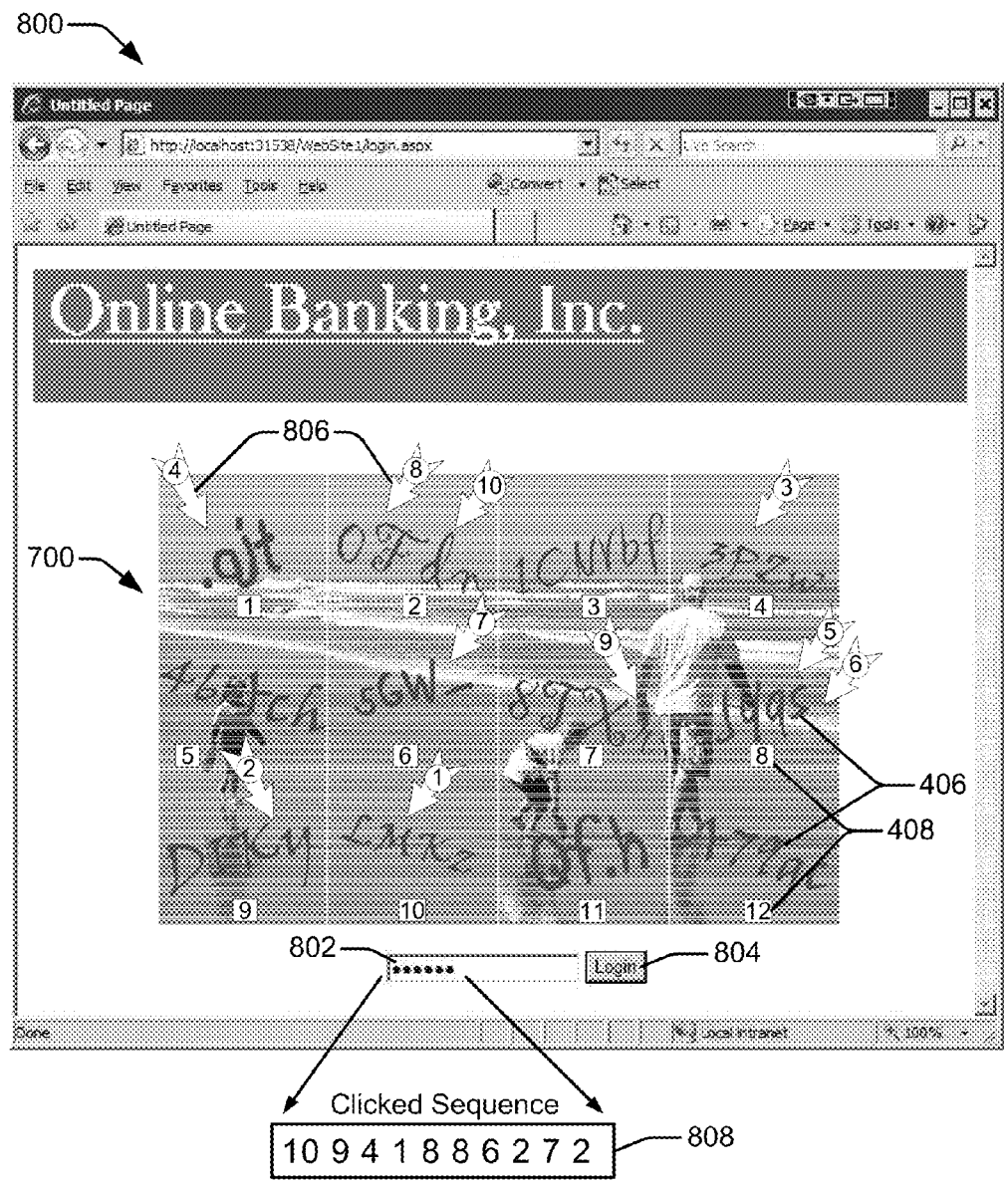
FIG. 8 shows an example of a web page from a server which enables a user to click on distorted character groups within an image according to an embodiment.
FIG. 9 shows an expected click sequence according to an embodiment.

Referring again to FIG. 2, after the image generation module 218 generates the image 700 (or images 500, 600, for example) containing distorted image groups, the image 700 is transferred from the server 104 to the client device 102 by login module 214. A user viewing the image 700 on the client 102 then clicks on the appropriate distorted character groups 406 from the image that contain the characters of the user's password (or other sensitive information) in the correct sequence. FIG. 8 illustrates an example of a web page 800 from server 104 being viewed on the client 102 which enables a user to click on distorted character groups 406 within an image 700 as part of a login session. The arrows 806 with circled numbers do not appear on the web page 800, but they are shown in FIG. 8 for the purpose of this discussion to illustrate the order in which a user should click on the distorted character groups 406 of image 700 to have the password 402 authenticated. In addition, the group index numbers 408 (i.e., index numbers 1-12 in small square boxes) assigned to each distorted character group 406 (as discussed above with respect to FIG. 4) do not appear on the web page 800, but are shown for the purpose of discussion.

A user at a client device 102 presented with web page 800 identifies a password 402 by clicking within the image 700 on distorted character groups 406 that contain characters of the password 402 in the correct sequence. Thus, since the password 402 is "MyPassW0rd", a user first clicks on the distorted character group 406 whose group index number is "10", as indicated by arrow #1. This enters index number 10 into the login box 802 as an indication of the first group 406 in a sequence of groups clicked on by the user. Note that the index numbers are hidden within the login box 802 as an additional security measure. Next, the user clicks on distorted character group 406 whose group index number is "9", as indicated by arrow #2. This enters index number 9 into the login box 802 as the second group 406 in the sequence. Next, the user clicks on distorted character group 406 whose group index number is "4", as indicated by arrow #3. This enters index number 4 into the login box 802 as the third group 406 in the sequence. The user continues clicking in this manner until each character of "MyPassW0rd" is accounted for and the user's clicked sequence 808 is present in login box 802. In this example, the user clicks ten times within image 700 to account for each of the ten characters in the password 402, "MyPassW0rd".

After accounting for each of the ten characters in the password 402 by clicking on appropriate distorted character groups 406, the user clicks the Login radio button 804 which transfers the clicked sequence 808 sequence in the login box 802 back to the server 104 as a location index. The location index contains the user's clicked sequence 808 of group index numbers that indicates which distorted character groups 406 the user clicked, and in what sequence they were clicked. Although the location index is described here as a sequence of group index numbers which identify the distorted character groups 406 clicked on by a user, the location index may identify the distorted character groups 406 by other methods known to those skilled in the art, such as by X, Y coordinates within image 700 which the server 104 can interpret to determine the distorted character groups 406 clicked on by a user. In addition, it is to be understood that there may be numerous ways known to those skilled in the art of transferring the click information entered by the user from the client 102 to the server 104, and that FIG. 8 is merely intended to provide a non-limiting example for the purpose of discussion.

The login module 214 receives the clicked sequence 808 (i.e., location index) from the client device 102 and forwards it to the comparison module 220. Assuming the user clicked on image 700 correctly, the location index should provide a clicked sequence 808 that is identical to an expected sequence 900 shown in FIG. 9. The comparison module 220 compares the clicked sequence 808 with the expected sequence 900 which correctly identifies the password 402. The server 104 knows what sequence to expect by virtue of knowing the password 402 and because it created the image 700 with the distorted character groups 406 that contain the password characters. If the clicked sequence 808 matches the expected sequence 900, the user has correctly identified the password 402 and the comparison module 220 authenticates the password and grants the user access to server 104. If the sequences do not match, the user has failed to identify the password 402 and the comparison module 220 denies the authentication and does not grant the user access to server 104.

As noted above, once a successful login or authentication has occurred for a particular user, in subsequent requests the server 104 can make various changes that will help prevent a hacker from automatically or manually replaying the click sequence 808 made by the true user. For example, in a subsequent login or authentication attempt, the server 104 can generate a new image by changing the physical location of the distorted character groups 406 within the image, creating new distorted character groups containing different characters to make up the image, changing the distortion of the characters within distorted character groups, and/or any Combination of these. After unsuccessful logins or authentications, the server 104 may keep the image the same without altering the distorted image groups, as this does not reveal any new information if the login attempt is made by a criminal hacker, and it eases usage for authentic users who have made inadvertent errors when clicking on the image.

Figure 10:
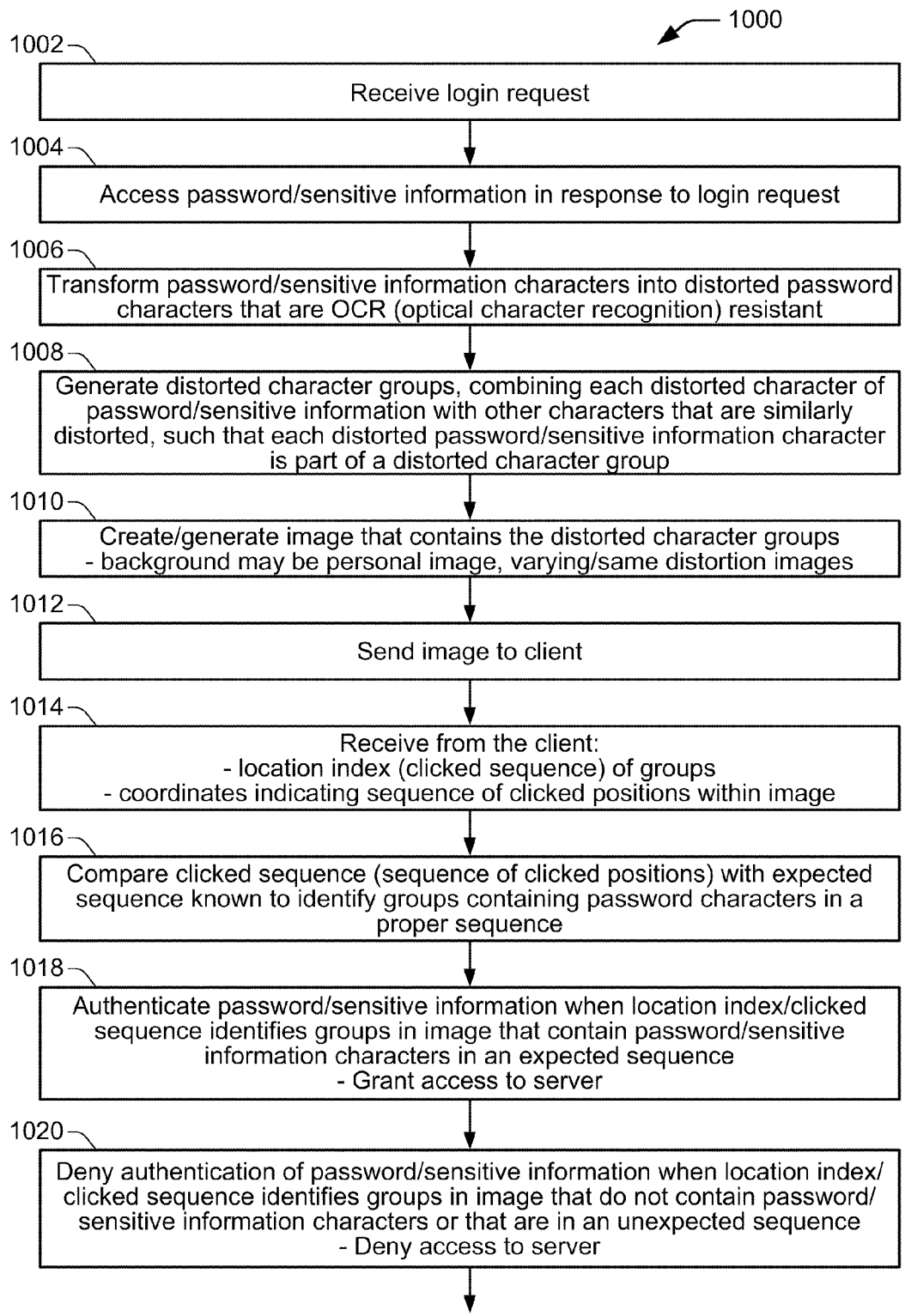
FIGS. 10 and 11 show a flowchart of method(s) of authentication according to an embodiment.
Figure 11:
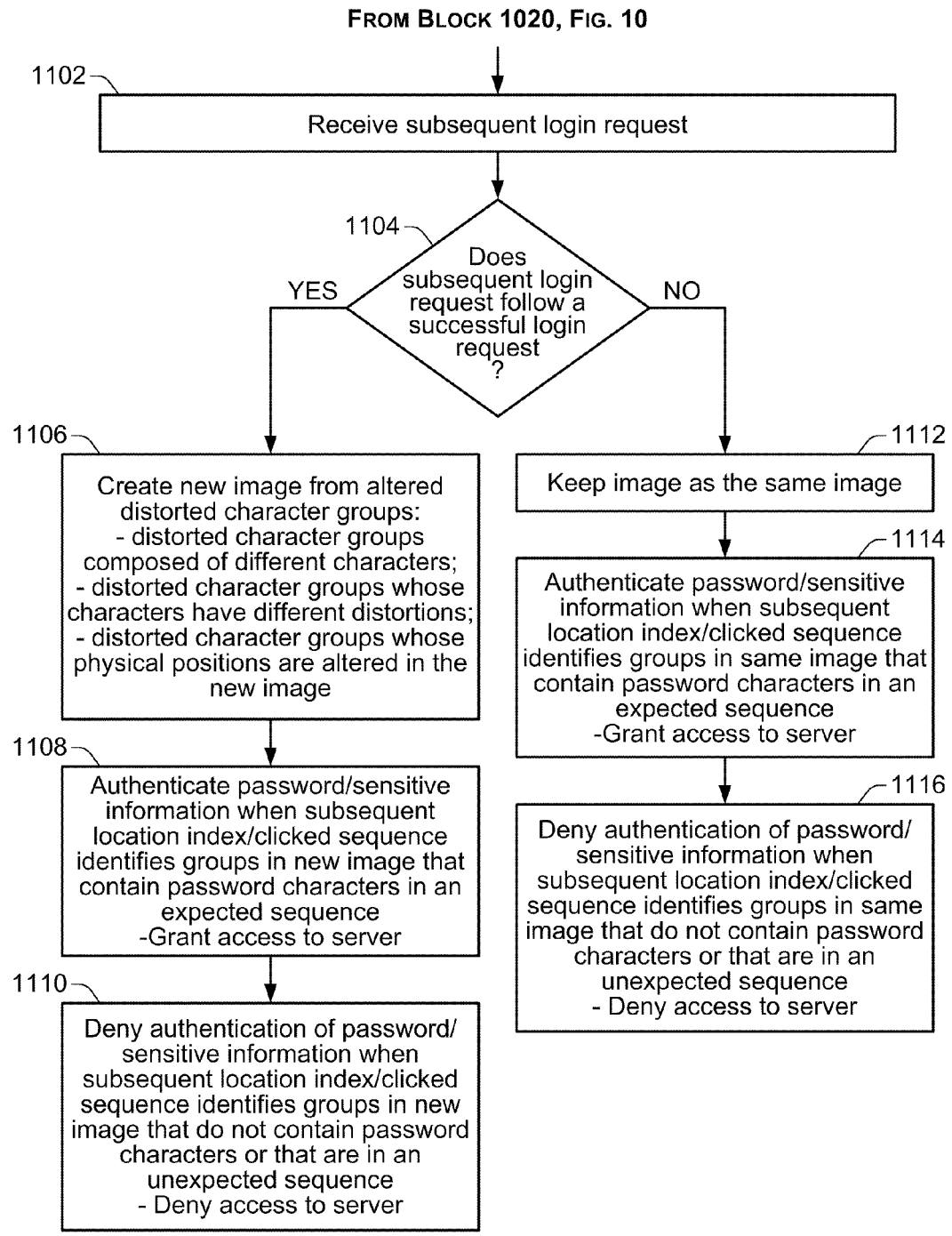

Referring now primarily to FIGS. 10 and 11, methods of authentication will now be discussed. FIGS. 10 and 11 show a flowchart of method(s) 1000 of authentication according to an embodiment. Method(s) 1000 are generally associated with embodiments of an authentication system discussed above with respect to FIGS. 1 through 9. Thus, method(s) 1000 will also be discussed with reference to FIGS. 1 through 9.

Method(s) 1000 begin at block 1002 of FIG. 10, with receiving a login request. The login request is received at a server 104, and can be any request to log into the server 104 and/or request for information and services from the server 104. The request generally includes one or more identifiers that identify a user such as a user ID and/or a pre password. At block 1004, password information or other sensitive information associated with the user is accessed in response to the login request. The password information or other sensitive information is information that has previously been provided by the user and stored in a memory on the server 104, typically at the time the user set up an account with the server 104. At block 1006, characters of the password or other sensitive information are transformed into distorted password/sensitive information characters that are OCR (optical character recognition) resistant. As discussed above, OCR resistant characters generally have distorted shapes and/or positions and are embedded in an image having some type of background clutter.

At block 1008 of method(s) 1000, distorted character groups are generated by combining each distorted character of the password/sensitive information with other characters that have been similarly distorted. The distorted character groups are generated such that each distorted password/sensitive information character is part of a distorted character group. Each distorted character group need not contain a distorted password/sensitive information character and some distorted character groups may contain more than one password/sensitive information character.

At block 1010 of method(s) 10005 an image is created or generated that contains the distorted character groups. The background to the image may be made up of varying distortion images such as discussed above with respect to the transformation of characters into OCR resistant characters. The background to the image may also be made up of a single distortion image or a personal image provided by the user during a previous account set up. The image is sent to the user at a client as shown at block 1012. The user then clicks within the image on the distorted character groups in the image that contain, in the proper sequence, the characters that make up the password or other sensitive information.

Continuing at block 1014, the click sequence entered by the user at the client is then received by the server in the form of a location index or X, Y coordinates identifying the distorted character groups the user clicked on and in what sequence the groups were clicked. At block 10165 the server Compares the clicked sequence (identified in the location index or X, Y coordinates) with an expected sequence which is known to identify the correct distorted character groups containing the password characters or sensitive information characters in a proper sequence. The server authenticates the password or sensitive information when the clicked sequence identifies groups in the image that contain the password or sensitive information characters in the expected sequence. When the server authenticates the password or sensitive information, it grants access to the server as shown at block 1018. However, as shown at block 1020, the server will deny authentication of the password or sensitive information when the clicked sequence identifies groups in the image that do not contain the password or sensitive information characters or when the characters are in an unexpected sequence. If authentication is denied, the server also denies access to the server.

The method(s) 1000 continue at block 1102 of FIG. 11. At block 1102, a subsequent login request is received. The server determines at decision block 1104, if the subsequent login request is following a previous successful login request or a previous unsuccessful login request. If the previous login request was a successful login request, a new image is created from altered distorted character groups as shown at block 1106. That is, the exact same distorted character groups will not be used to create the image. The distorted character groups may be composed of different characters than were previously used. The distorted character groups may have different distortions applied to the characters (e.g., characters may be shaped differently). The distorted character groups may be placed in different physical positions within the new image. These and various combinations of alterations may be made to the distorted character groups in creating the new image.

At block 1108, the server authenticates the password or sensitive information and grants access to the server when a clicked sequence from a user identifies groups in the new image that contain the password or sensitive information characters in an expected sequence. However, as shown at block 1110, the server will deny authentication of the password or sensitive information and deny access to the server when the clicked sequence identifies groups in the new image that do not contain the password or sensitive information characters or when the characters are in an unexpected sequence.

Referring again to decision block 1104, if the previous log in request was an unsuccessful login request, the image is kept or created to be the same image as used in the previous login request. That is, the same distorted character groups will be used in the same physical positions to create the image. Then, at block 1114, the server authenticates the password or sensitive information and grants access to the server when a clicked sequence from a user identifies groups in the same image that contain the password or sensitive information characters in an expected sequence. However, as shown at block 1116, the server will deny authentication of the password or sensitive information and deny access to the server when the clicked sequence identifies groups in the same image that do not contain the password or sensitive information characters or when the characters are in an unexpected sequence.

What is claimed is:

1. A method of authentication comprising:
receiving a login request;
accessing a password in response to the login request;
transforming password characters into distorted password characters;
generating, by a processor, distorted character groups such that each distorted password character is part of a group;
creating an image that includes the distorted character groups at grid locations within the image;
receiving a location index that identifies a clicked sequence of grid locations; and
authenticating the password when the clicked sequence of grid locations matches an expected sequence of the password characters.

2. A method as recited in claim 1, wherein authenticating comprises:
sending the image to a client;
receiving the location index from the client; and
comparing the clicked sequence with the expected sequence.

3. A method as recited in claim 1, further comprising denying authentication of the password when the location index identifies a clicked sequence of grid locations whose distorted character groups do not contain password characters in the expected sequence.

4. A method as recited in claim 1, further comprising granting access to a server when the password is authenticated.

5. A method as recited in claim 1, wherein creating an image includes creating an image having a background selected from the group consisting of:
a personal background image from a user;
a single distortion background image; and
multiple distortion background images that vary between the groups.

6. A method as recited in claim 1, further comprising:
receiving a subsequent login request;

determining if the subsequent login request follows a successful login request;
creating a new image if the subsequent login request follows a successful login request;
keeping the image as a same image if the subsequent login request follows an unsuccessful login request;
authenticating the password when a subsequent location index identifies groups within either the new image or the same image that contain the password characters in an expected sequence.

7. A method as recited in claim 6, wherein creating a new image comprises creating the new image from altered distorted character groups selected from the group consisting of:
distorted character groups composed of different characters;
distorted character groups whose characters have different distortions; and
distorted character groups whose physical positions are altered in the new image.

8. A method as recited in claim 1, wherein one or more of the groups does not contain a distorted password character.

9. A method as recited in claim 1, wherein one or more of the groups contains more than one distorted password character.

10. A method as recited in claim 1, wherein creating an image comprises positioning the groups in the image in a rectangular grid pattern.

11. A method of authentication comprising:
receiving a client request;
accessing sensitive information in response to the client request;
transforming characters of the sensitive information into distorted characters that are OCR (optical character recognition) resistant;
combining each distorted character of the sensitive information with other characters that are also distorted such that each distorted character of sensitive information is present within a distorted character group;
generating, by a processor, an image with the distorted character groups at grid locations within the image;
receiving a sequence of clicked grid locations; and
authenticating the sensitive information when the sequence of clicked grid locations identifies characters of the sensitive information in a proper sequence.

12. A method as recited in claim 11, wherein the authenticating further comprises:
sending the image to a client;
receiving from the client, coordinates indicating the sequence of clicked grid locations; and
comparing the sequence of clicked grid locations to an expected sequence.

13. A method as recited in claim 11, wherein the client request is a user login request, the method further comprising accessing the sensitive information in response to the login request.

14. A method as recited in claim 13, wherein accessing the sensitive information comprises accessing a password previously provided by the user.

15. An authentication system comprising:
a server to authenticate sensitive information;
a login module on the server to receive login requests and retrieve the sensitive information in response to the requests;
an image generation module on the server to generate an image comprising distorted character groups at grid locations within the image, wherein distorted characters of the sensitive information are distributed among the groups such that each distorted character of the sensitive information is part of a group; and
a comparison module on the server to receive a location index comprising a user-selected sequence of grid locations and to compare an expected sequence with the user-selected sequence and to grant user access to the server when the user-selected sequence matches the expected sequence.

* * * * *